US011796002B2

(12) United States Patent
Larbig et al.

(10) Patent No.: US 11,796,002 B2
(45) Date of Patent: Oct. 24, 2023

(54) BEARING ARRANGEMENT FOR A MACHINE ELEMENT

(71) Applicant: ZF FRIEDRICHSHAFEN AG, Friedrichshafen (DE)

(72) Inventors: Julian Larbig, Ringgau (DE); Steffen Matschas, Bad Bocklet (DE); Michael Grafelmann, Veitshöchheim (DE); Ingo Krafft, Werneck (DE); Axel Rohm, Schonungen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/793,119

(22) PCT Filed: Jan. 14, 2021

(86) PCT No.: PCT/EP2021/050640
§ 371 (c)(1),
(2) Date: Jul. 15, 2022

(87) PCT Pub. No.: WO2021/144337
PCT Pub. Date: Jul. 22, 2021

(65) Prior Publication Data
US 2023/0053112 A1 Feb. 16, 2023

(30) Foreign Application Priority Data
Jan. 17, 2020 (DE) ..................... 10 2020 200 528.1

(51) Int. Cl.
*F16C 19/06* (2006.01)
*F16C 35/04* (2006.01)
(Continued)

(52) U.S. Cl.
CPC ............ *F16C 33/583* (2013.01); *F16C 19/06* (2013.01); *F16C 35/045* (2013.01); *F16C 35/067* (2013.01); *F16D 23/14* (2013.01)

(58) Field of Classification Search
CPC ...... F16C 19/06; F16C 33/583; F16C 35/067; F16C 35/077; F16C 2226/54;
(Continued)

(56) References Cited

U.S. PATENT DOCUMENTS

2014/0373650 A1  12/2014  Iwakawa
2018/0202496 A1   7/2018  Yang et al.

FOREIGN PATENT DOCUMENTS

DE      2519023 A  * 11/1976  ............ F16C 35/067
DE   102010061914      5/2012
(Continued)

OTHER PUBLICATIONS

Office Action of corresponding German Patent Application No. 10 2020 200 528.1.

*Primary Examiner* — Phillip A Johnson
(74) *Attorney, Agent, or Firm* — Cozen O'Connor

(57) ABSTRACT

Bearing arrangement with a bearing having an outer bearing race; a machine element with a cylindrical cutout receiving and securing the outer bearing race; and a circumferentially constructed groove adjoins a first axial side of the cylindrical cutout and extends radially outward to receive a locking element for securing the outer bearing race at the first axial side of the groove; an annular locking element having an inner diameter which is larger in a mounting state than in a securing state. The locking element is partially guided in the constructed circumferential groove to secure the outer bearing race at the first axial side in the securing state; and a securing device cooperates with the locking element to secure a changed state of the locking element; and the securing device secures the locking element from an outer
(Continued)

side of the machine element opposite the first axial side of the cylindrical cutout.

14 Claims, 14 Drawing Sheets

(51) Int. Cl.
*F16C 33/58* (2006.01)
*F16C 35/067* (2006.01)
*F16D 23/14* (2006.01)

(58) Field of Classification Search
CPC .............. F16C 2226/60; F16C 2226/62; F16C 2226/72; F16C 2226/74; F16C 2226/76; F16C 2361/42; F16C 35/045; F16D 23/14; F16D 2021/0615
See application file for complete search history.

(56) References Cited

FOREIGN PATENT DOCUMENTS

| | | |
|---|---|---|
| DE | 202013004157 | 6/2013 |
| DE | 102015213022 | 1/2017 |
| EP | 3056750 | 8/2016 |
| WO | WO 2011067152 | 6/2011 |

* cited by examiner

BEARING ARRANGEMENT FOR A MACHINE ELEMENT

CROSS REFERENCE TO RELATED APPLICATIONS

This is a U.S. national stage of Application No. PCT/EP2021/050640 filed Jan. 14, 2021. Priority is claimed on German Application No. DE 10 2020 200 528.1 filed Jan. 17, 2020 the content of which is incorporated herein by reference.

BACKGROUND OF THE INVENTION

1. Field of the Invention

The disclosure is directed to a bearing arrangement for a machine element having a locking element and at least one securing device and a use of the bearing arrangement for mounting an input shaft on an output hub.

2. Description of Related Art

Bearing arrangements are used in very diverse fields of application in which an outer race of the bearing is to be secured radially and axially and the device for axially securing the bearing are not freely accessible from the mounting side during mounting or removal. One example is a clutch device for a motor vehicle that makes it possible to bring about a torque-transferring connection between the output of a combustion engine or electric machine and a transmission downstream thereof.

SUMMARY OF THE INVENTION

Therefore, the problem presenting itself is to suggest an improved bearing arrangement which, in particular, requires less installation space and is, at the same time, inexpensive to produce and which makes it possible to mount and remove the bearing arrangement without at least some of the elements for axially securing the bearing being freely accessible.

Corresponding to an aspect, for at least partially solving the problems described above, a bearing arrangement for a machine element having a locking element and at least one securing device and a use of the bearing arrangement for mounting an input shaft on an output hub are suggested.

According to an aspect, a bearing arrangement for a machine element is suggested having a bearing that has an outer bearing race, a machine element, an annular locking element and at least one securing device. The machine element has a cylindrical cutout for receiving and radially securing the outer bearing race and a circumferentially constructed groove. The circumferentially constructed groove adjoins a first axial side of the cylindrical cutout and extends axially outward in order to receive a locking element for securing the outer bearing race at the first axial side of the groove. The annular locking element has an inner diameter, which is larger in a mounting state than in a securing state. The locking element is guided at least partially in the constructed circumferential groove in order to secure the outer bearing race at the first axial side in the securing state. The at least one securing device is adapted to cooperate with the locking element in order to secure a changed state of the locking element. Further, the securing device is adapted to secure the state of the locking element proceeding from an outer side of the machine element opposite the first axial side of the cylindrical cutout.

A bearing arrangement of this kind can be used, for example, in the powertrain of a motor vehicle.

The bearing comprises the outer race and an inner race. The outer race and the inner race of the bearing are rotatable relative to one another. Rolling elements can be arranged between the inner race and the outer race to reduce the friction resistance between the inner race and the outer race. Further, the outer race can at least partially have a cylindrical contour. The bearing can be configured in particular as a rolling element bearing, for example, a grooved ball bearing.

The concept of adapting the at least one securing device to cooperate with the locking element is to be understood in a broad sense. It means that the securing device can be adapted alternatively or the locking element can be adapted additionally to cooperate in any form to secure a changed state of the locking element and accordingly to secure the outer bearing race at the first axial side of the cylindrical cutout of the machine element in the securing position of the locking element and accordingly to limit a displacement of the machine element in the direction of the first axial side.

In this regard, the locking element need not adjoin the entire first axial side of the outer bearing race. On the contrary, it is sufficient that the locking element adjoin a portion of the first axial side in such a way that the outer bearing race is axially fixed in direction of the first side. The outer bearing race can then always still be axially moveable in direction of the second side.

The machine element can be a rotating component part, for example, a part of a transmission. The inner race of the bearing can be connected to a housing part that is fixed with respect to rotation or to a rotating shaft. Alternatively, the machine element can also be a component part that is fixed with respect to rotation, for example, a housing. In this case, the inner race of the bearing is connected to a rotatable shaft.

The cylindrical cutout of the machine element for receiving the outer bearing race of the bearing corresponds to the dimensioning of the cylindrical contour of the outer bearing race so that the bearing is radially fixed in the cylindrical cutout.

The construction of the bearing arrangement described here is advantageous particularly for a bearing arrangement with a necessarily concealed axial securing of at least one side of a bearing, i.e., when there is no direct access from a mounting side to a locking element which secures a first axial side of the bearing. Namely, when the machine element limits access to the annular locking element during assembly, but the at least one securing device is accessible from the mounting side and cooperates with the locking element to secure the state of the locking element, a mountable and removable bearing arrangement can be realized.

This bearing arrangement results in a simple arrangement which, in particular, requires little installation space for securing the bearing in a direction of the first axial side. Since the securing device in this bearing arrangement can be accessed from the mounting side, it is also possible to inspect the state of the locking element.

According to an aspect, it is suggested that the machine element comprises a first machine part and a second machine part. The first machine part is connected, particularly riveted and/or welded, to the second machine part. Further, the constructed groove is formed between the first machine part and the second machine part. For example, the first machine part has a laterally open groove and the second machine part has a shoulder of the groove. When the two machine parts are connected to one another, the completed constructed groove results. A laterally open groove is particularly simple to produce, for example, by punching or drilling, to avoid laborious milling of an inner groove.

The annular locking element can be inserted into the constructed groove in a simple manner before the constructed groove is formed by connecting the first machine part and second machine part.

In an advantageous embodiment example, the first machine part is an input shaft and the second machine part is a plate carrier. Since the input shaft and the plate carrier are connected to one another anyway, introducing a lateral groove, particularly in the input shaft, is merely a slight modification of the production process.

According to an aspect, it is suggested that the outer bearing race of the bearing arrangement is secured at an abutment face adjoining a second axial side of the cylindrical cutout, this second axial side being located axially opposite the first axial side. In this way, it can be brought about that the bearing is secured in both axial directions together with the locking element; securing in a radial direction is carried out by the cylindrical cutout of the machine element.

According to an aspect, it is suggested that the annular locking element of the bearing arrangement is constructed as an open, elastic ring and has tongues, which are directed radially inward in order to secure the outer bearing race at the first axial side of the cylindrical cutout with a radially inner end region of the tongues. With this construction of the annular locking element, the locking element can be elastic so as to be deformed in such a way that the locking element can be deformed in the mounting state in such a way that the inner diameter of the locking element is larger than the outer diameter of the outer bearing race and also in the securing state in that the inner diameter of the locking element is smaller than the outer diameter of the outer bearing race and can secure the outer bearing race by the tongues.

The locking element can have a plurality of radially inwardly directed tongues on a circumference of an annular portion of the locking element that are uniformly distributed on the circumference.

According to an aspect, it is suggested that the locking element of the bearing arrangement adjoins an end face of the outer bearing race at least with a part of the respective radially inwardly directed tongues in order to secure the outer bearing race on the axial side. For securing in this way, it can be sufficient that the locking element adjoins the end face of the axial side of the outer bearing race. A bearing arrangement of this kind requires few modifications of the bearing, has a small space requirement and is simple to assemble.

The locking element can be constructed corresponding to a snap ring, and the snap ring and the tongues can be formed, for example, in one piece by cutting out and shaping.

A locking element which is preloaded outward corresponding to a snap ring has an inner diameter in the relaxed state that is larger than the outer diameter of the outer bearing race and contacts the radially outer outside surface of the constructed groove in the relaxed state, which then corresponds to the mounting state, and can be brought into the securing state by the at least one securing device.

According to an aspect, it is suggested that the at least one securing device of the bearing arrangement is formed in such a way and is movably arranged in a work access opening of the machine element in such a way that the securing device through displacement in the work access opening cooperates with the locking element by a wedging effect such that the state of the locking element is changed and is secured.

Work access openings are, for example, bore holes in axial direction in the machine element.

Since the securing device is accessible from the mounting side of the machine element, the machine element can be pushed over the outer bearing race and brought into the securing state by the securing device, which can change the state of the locking element from a mounting state with an inner diameter that is larger than the outer diameter of the outer bearing race, in which securing state the locking element has an inner diameter that is smaller than the outer bearing race in order to secure the outer bearing race.

According to an aspect, it is suggested that the at least one securing device of the bearing arrangement is constructed as a threaded pin with a conical tip. The threaded pin has a mechanism on the side opposite the tip for engagement of a tool. The work access opening has a thread corresponding to the threaded pin in order to cooperate with the locking element and to change and secure a state of the locking element during an insertion of the threaded pin into the work access openings.

According to an aspect, it is suggested that the bearing arrangement has a plurality of securing devices arranged on an annular support, and the machine element has a suitable spatially corresponding plurality of work access openings. The respective securing device has a conical tip for inserting into the corresponding work access opening to cooperate with the locking element during an insertion of the securing device into the work access openings in order to change and secure a state of the locking element.

According to an aspect, it is suggested that the annular support and a core of the respective securing device are produced from plastic and the respective securing device has an outer metal sleeve which is secured against displacing relative to the core by a crimp extending around the circumference of the securing device.

The annular support with the plurality of securing devices can be produced at low cost in a simple manner by using plastic. Further, the securing device can be formed from plastic in such a way that the securing device has an oil-guiding function in addition.

According to an aspect, it is suggested that the at least one securing device of the bearing arrangement is formed as a clamp from a shaped flat metal material with essentially three flat parts and has a wedge-shaped sliding surface and a crimp in the wedge-shaped sliding surface for fixing the clamp in a work access opening of the machine element.

According to an aspect, it is suggested that the bearing arrangement has a plurality of securing devices that are arranged on an annular support, and the machine element has a suitable spatially corresponding plurality of work access openings. The respective securing device has a wedge-shaped sliding surface for inserting into the corresponding work access opening so as to cooperate with the locking element when the securing device is inserted into the work access openings in order to change and secure a state of the locking element.

According to an aspect, it is suggested that the respective securing device with wedge-shaped sliding surface has a radially inwardly open groove in which the locking element can engage in the securing position in order to fix the securing device in the securing position of the locking element.

According to an aspect, it is suggested that the bearing arrangement has a plurality of securing devices and an annular support for the plurality of securing devices, the plurality of securing devices being uniformly distributed on a circumference of the annular support.

According to an aspect, it is suggested that the locking element of the bearing arrangement has a plurality of tongues that are adjusted relative to a radial portion of the locking element. The radial portion of the locking element is arranged in a groove which is constructed in the manner described above, and a machine element has a suitable spatially corresponding plurality of work access openings. Each of the tongues extends through a corresponding work access opening and beyond to the outer side of the machine element in the mounting state of the bearing arrangement. The securing device is configured as a closed ring with a trapezoidal cross section, and the ring is configured in such a way and cooperates with an end region of the respective tongue in such a way that the securing state of the locking element is secured.

The adjustment of the tongues at the locking element can be formed by rolling, deforming or bending.

According to an aspect, it is suggested that the locking element of the bearing arrangement is constructed as an open, elastic ring and has a locking leg at each open end. The machine element has two securing stops which cooperate with the two locking legs such that the locking element has the mounting state or the securing state depending on a position of the locking legs relative to the securing stops.

According to an aspect, it is suggested that the locking legs of the locking element are adapted to receive a tool in order to adjust the position of the locking legs relative to the securing stops for the mounting state or the securing state.

A use of one of the above-described bearing arrangements for mounting an input shaft on an output hub is suggested. The input shaft can be connected to a plate carrier.

BRIEF DESCRIPTION OF THE DRAWINGS

Embodiment examples of the invention are described in more detail in the following referring to the schematic drawings in which like or similar elements are provided with the same reference numerals. The drawings show.

DETAILED DESCRIPTION OF THE PRESENTLY PREFERRED EMBODIMENTS

Figure 1A:
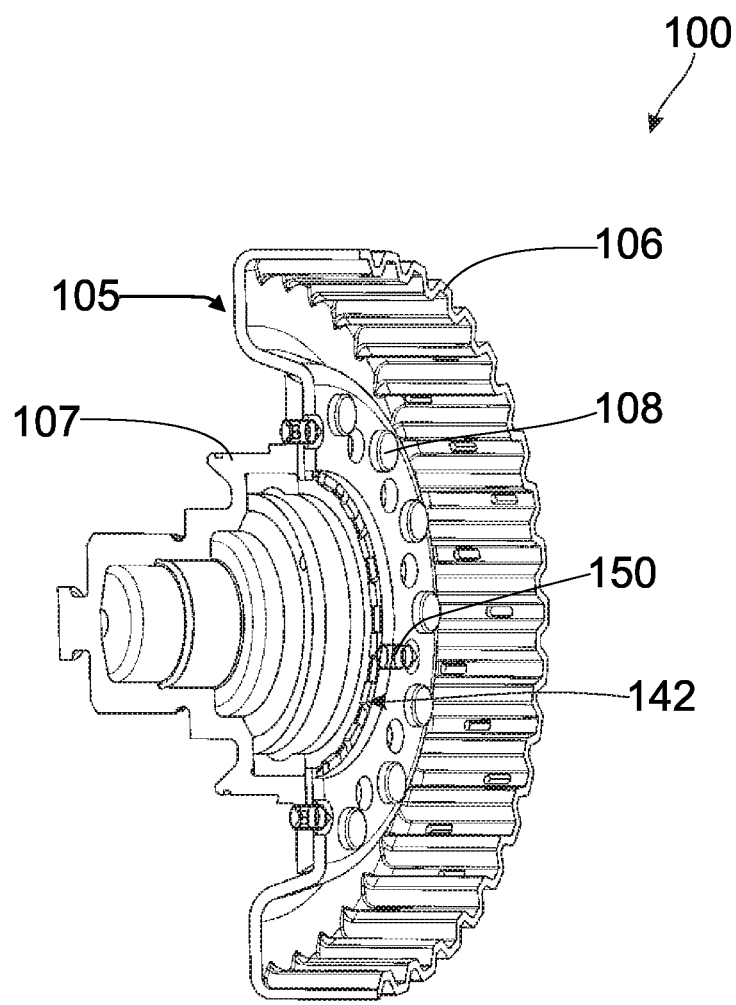
FIG. 1A an isometric view of a bearing arrangement.
Figure 1B:
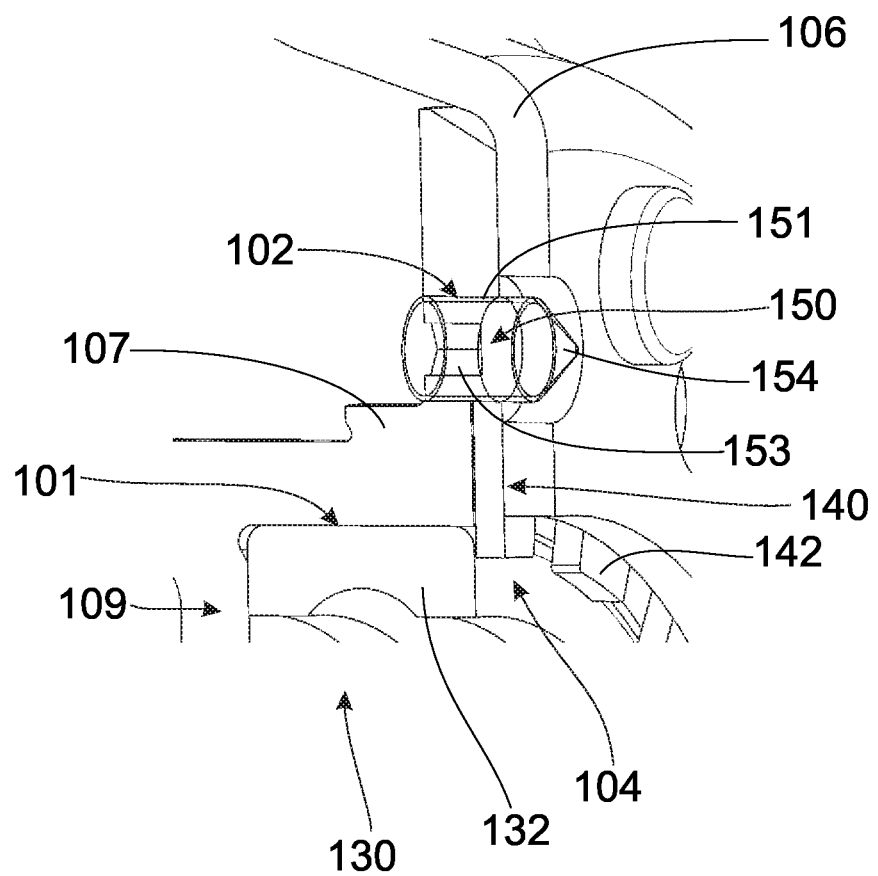
FIG. 1B a detail view from FIG. 1A.
Figure 1C:
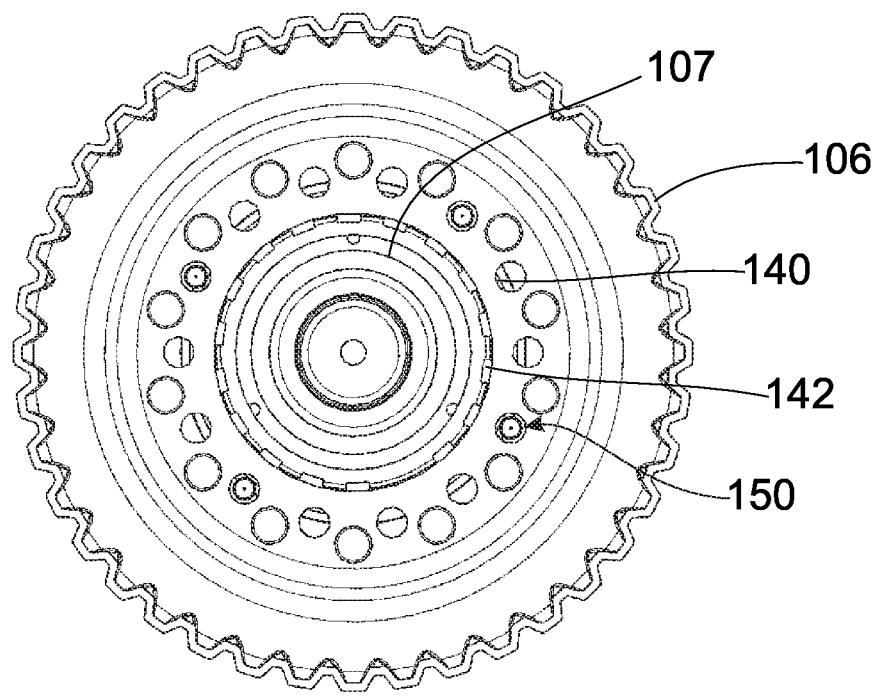
FIG. 1C a view of the bearing arrangement from FIG. 1A from the bearing side.
Figure 1D:
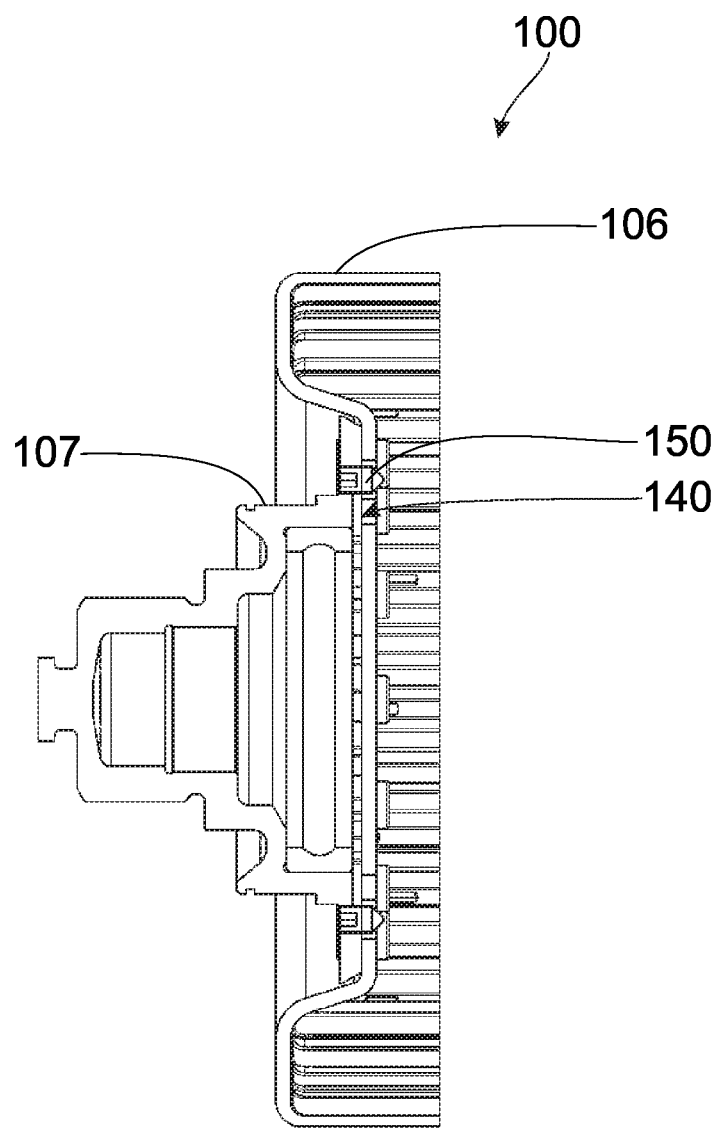
FIG. 1D a cross section of the bearing arrangement from FIG. 1A.

FIGS. 1A to 1F show a mounted bearing arrangement 100 and details of the bearing arrangement 100 in which the securing device for the locking element is constructed as a threaded pin.

The bearing arrangement 100 for a machine element 105 has a bearing 130 with an outer bearing race 132, a machine element 105, an annular locking element 140 and at least one securing device in the form of a threaded pin 150. The machine element 105 is constructed from at least a first machine part 106 and a second machine part 107. The machine element 105 has a cylindrical cutout 101 for receiving and radially securing the outer bearing race 132 and a circumferential constructed groove 104. The circumferential constructed groove 104 adjoins a first axial side of the cylindrical cutout 101 and extends axially outward to receive a locking element 140 for securing the outer bearing race 132 at the first axial side of the groove 104. The annular locking element 140 has an inner diameter, which is larger in a mounting state than in a securing state. The locking element 140 is at least partially guided in the constructed circumferential groove 104 in order to secure the outer bearing race 132 at the first axial side in the securing state. The at least one securing device 150 is adapted to cooperate with the locking element 140 to secure a changed state of the locking element 140. Further, the securing device 150 is adapted to secure the state of the locking element 140 proceeding from an outer side of the machine element 105 opposite the first axial side of the cylindrical cutout 101.

The outer bearing race 132 of the bearing arrangement 100 is secured at an abutment face 109 which adjoins a second axial side of the cylindrical cutout 101. The second axial side is axially opposite the first axial side. Accordingly, the outer bearing race 132 of the bearing 130 is secured together with the locking element 140 in both axial directions, and a securing of the outer bearing race 132 in a radial direction is effected by the cylindrical cutout 101 of the machine element 105.

The annular locking element 140 of the bearing arrangement 100 is constructed as an open, elastic ring and has tongues 142 which are radially inwardly directed in order to secure the outer bearing race 132 at the first axial side of the cylindrical cutout 101 with a radially inner end region of the tongues 142. With this construction of the annular locking element 140, the locking element 140 can be elastic so as to be deformed such that the locking element 140 can be deformed in the mounting state such that the inner diameter of the locking element 140 is larger than the outer diameter of the outer bearing race 132, and the locking element 140 can also be deformed in the securing state in which the inner diameter of the locking element 140 is smaller than the outer diameter of the outer bearing race 132 and can secure the outer bearing race 132 by the tongues 142.

Figure 1E:
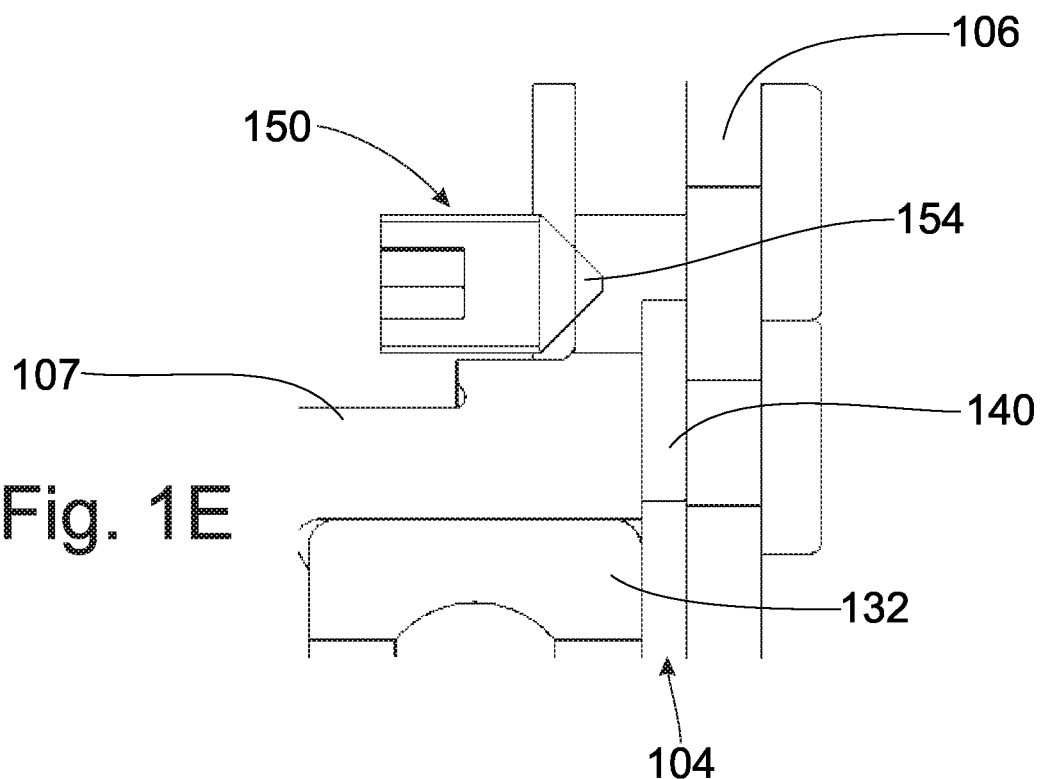
FIG. 1E a detail view from FIG. 1D.
Figure 1F:
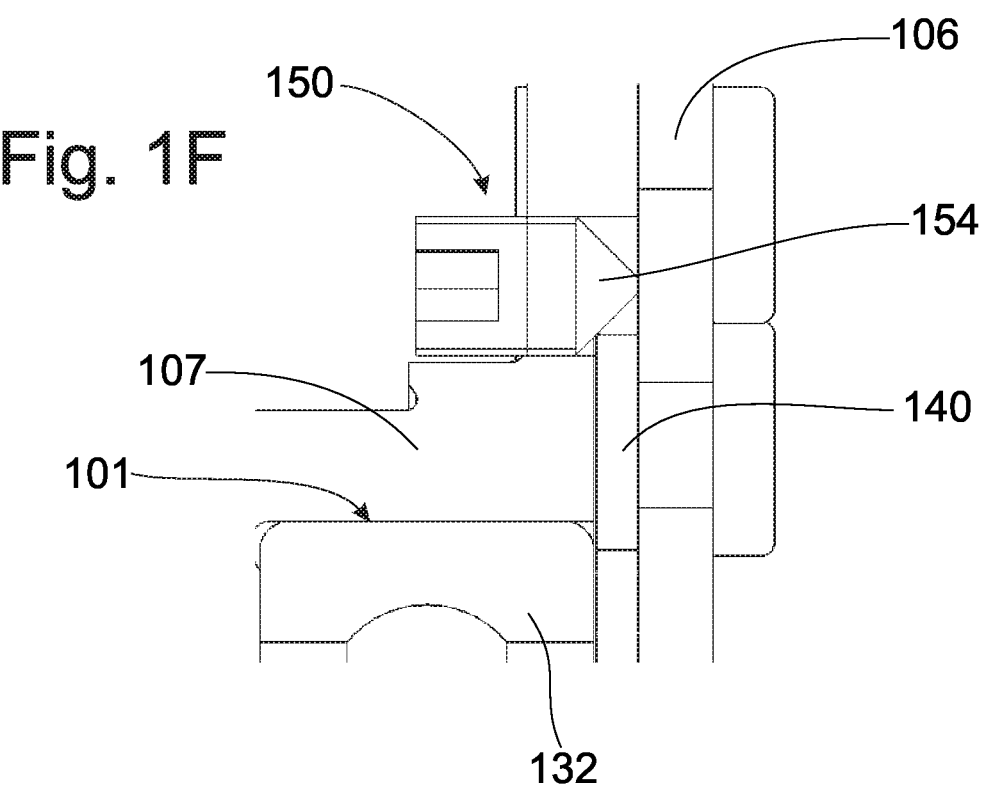
FIG. 1F a detail view from FIG. 1D.
Figure 1G:
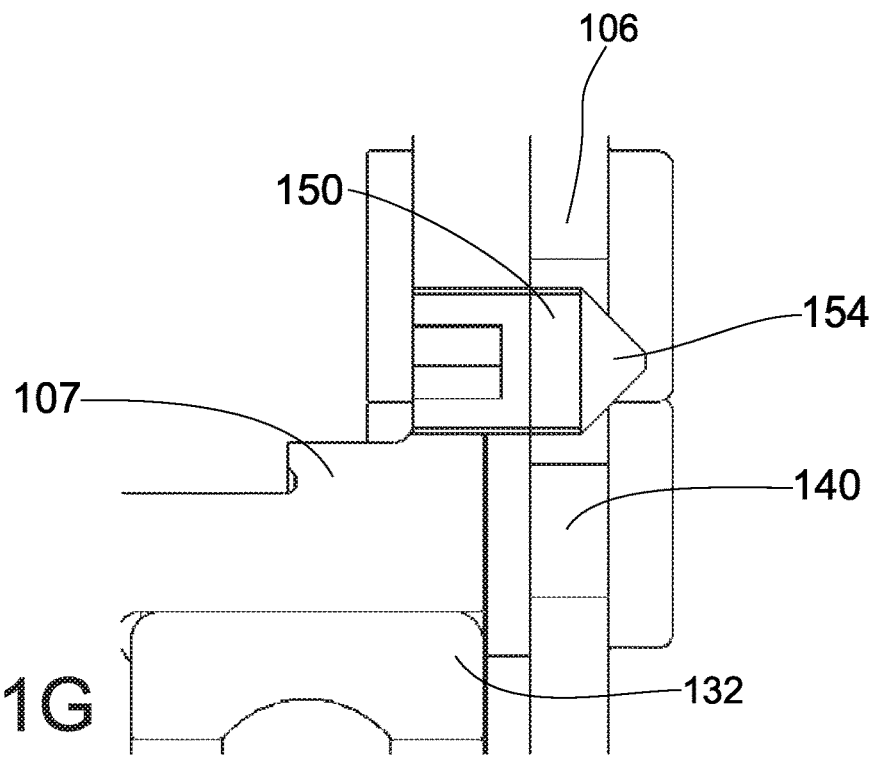
FIG. 1G a detail view from FIG. 1D.

The at least one securing device of the bearing arrangement 100 is constructed as a threaded pin 150 with a conical tip 154. Because the work access opening 102 has a thread 151 corresponding to the threaded pin 150, the at least one securing device of the bearing arrangement 100 is formed in such a way and moveably arranged in the work access opening 102 of the machine element 105 in such a way that, through displacement of the threaded pin 150 in the work access opening 102, the securing device 150 cooperates by the wedging effect of the conical tip 154 with a radially outer edge or an edge of an opening of the locking element 140 in such a way that the state of the locking element 140 can be changed and secured. Namely, because of a wedging effect brought about by the conical tip 154 at the edge of the locking element 140, the locking element is displaced in a radially inwardly directed direction in every location at which such a threaded pin 150 is arranged to spatially correspond to such an outer edge of the locking element 140 so that the inner diameter of the locking element 140 is reduced. This cooperation of the securing device in the form of the threaded pin 150 with the locking element 140 is illustrated in three phases in FIGS. 1e-g. In FIG. 1e, the threaded pin 150 is inserted into the thread 151 of the machine element 105 by the thread 151. On the side opposite the tip, the threaded pin 150 has a mechanism 153 for the engagement of a tool so that a rotational movement of the tool can be transferred to the threaded pin 150 and the threaded pin 150 can accordingly be displaced in the work access opening 102. In this position of the threaded pin 150, the locking element 140 is located deep in the constructed groove 104 owing to a corresponding elastic preloading of the locking element 140 and has an inner diameter that is larger than the outer diameter of the outer bearing race. FIG. 1F illustrates how the conical tip 154 cooperates with a radially outer edge of the locking element 140 by a wedging effect and displaces the locking element 140 in a radially inner direction. In FIG. 1G, the threaded pin 150 is inserted into the work access opening 102 of the machine element 105 deep enough that the threaded pin 150 secures the locking element 140 in the securing position and the locking element 140 has been displaced radially inwardly in the constructed groove 104 until the outer bearing race 132 is fixed on the first axial side of the cylindrical cutout 101 of the machine element 105.

Alternatively, the outer cylindrical surface of the outer bearing race 132 can have a step that spatially corresponds to the constructed groove 104 such that the locking element 140 contacts a front side of the step in order to secure the outer bearing race 132.

The machine element 105 itself has a first machine part 106 and a second machine part 107. In the present embodiment example, the first machine part 106 is formed as input shaft and the second machine part 107 is formed as plate carrier. The first machine part 106 and the second machine part 107 can be connected to one another by riveting 108 or welding.

Figure 2A:
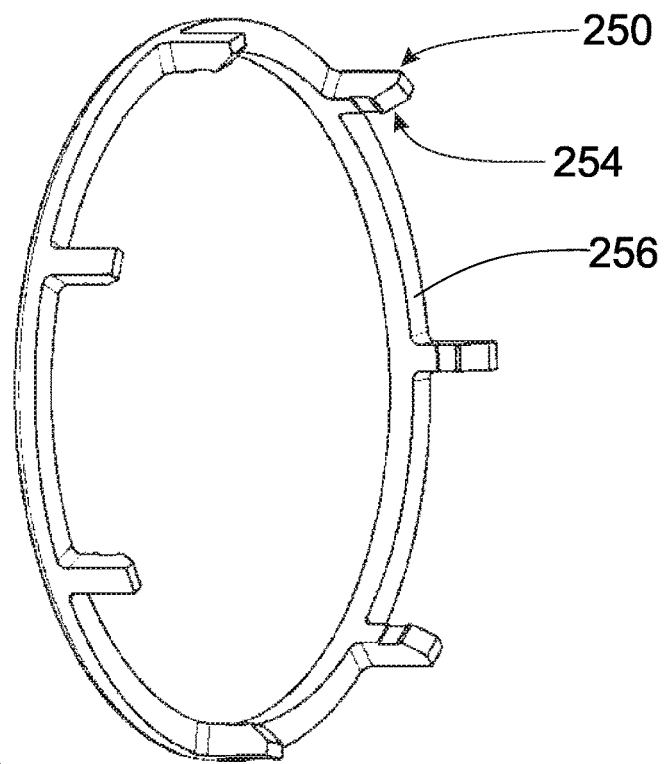
FIG. 2A a securing device.
Figure 2B:
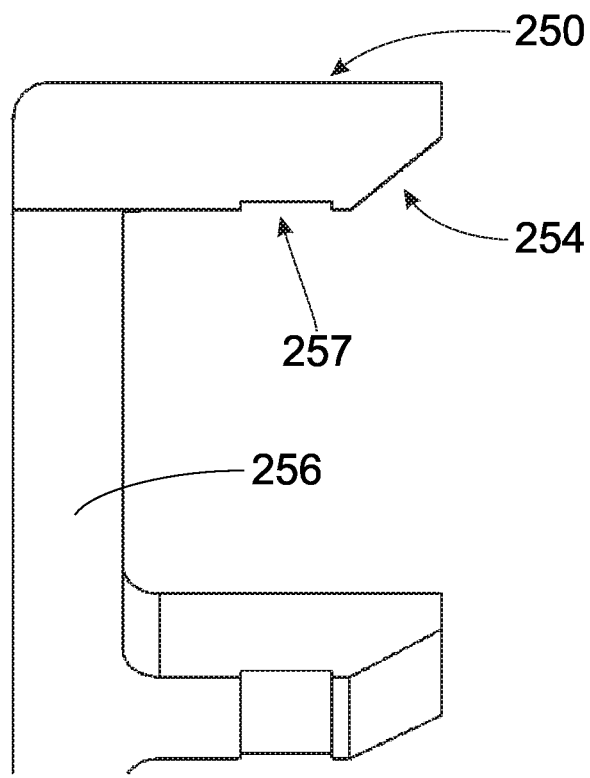
FIG. 2B a detail view from FIG. 2A.

FIGS. 2A and 2B show a plurality of securing device 250 which are arranged on an annular support 256. The machine element 105 has a suitable spatially corresponding plurality of work access openings 102 for the plurality of securing devices 250 to cooperate with the locking element 140. The respective securing device 250 has a wedge-shaped sliding surface 254 for insertion into the corresponding work access opening so as to cooperate with the locking element 140 when the securing device 250 is inserted into the work access opening 102 by a wedging effect in such a way that a state of the locking element 140 is changed and secured. The locking element 140 can have a mounting state or a securing state in both of its end positions.

In order to secure the respective securing device 250 itself in the securing position, the securing device 250 with the wedge-shaped sliding surface 254 additionally has a radially inwardly open groove 257 in which the locking element 140 can lock in the securing position owing to its elasticity, which brings about a radially outwardly directed force on the locking element 140 in the constructed groove 104.

The plurality of securing devices 250 are connected to an annular support 256 in such a way that the securing devices 250 are uniformly distributed on a circumference of the annular support 256.

Figure 3A:
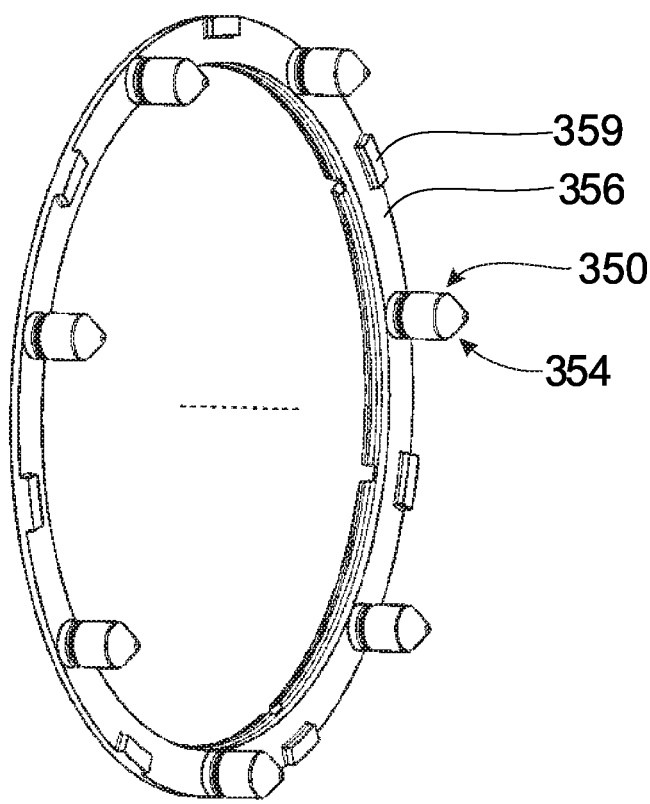
FIG. 3A a securing device.
Figure 3B:
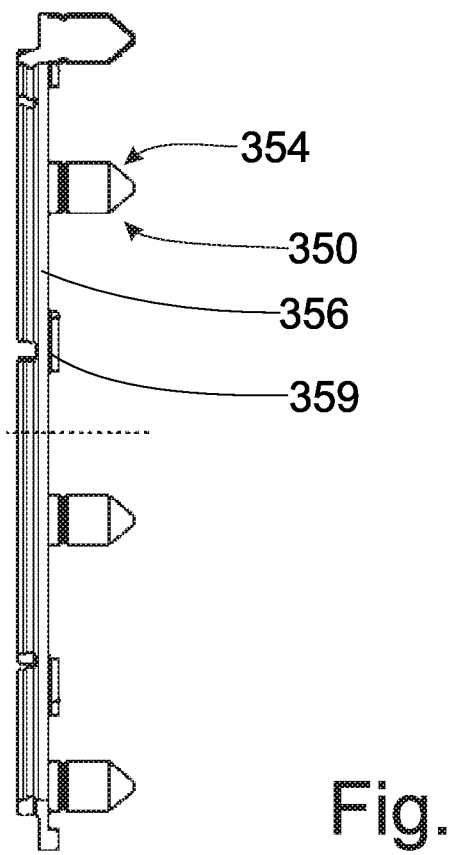
FIG. 3B a cross section of the securing device from FIG. 3A.
Figure 3C:
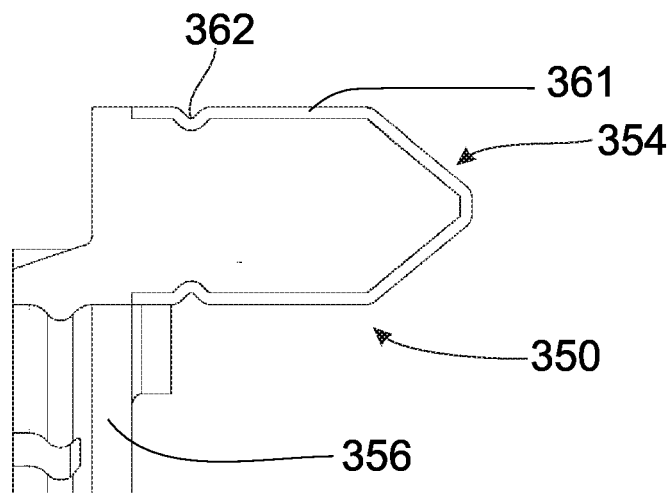
FIG. 3C a detail view from FIG. 3B.

FIGS. 3A to 3C show a plurality of securing devices 350 for a bearing arrangement which are arranged on an annular support 356. The machine element 105 has a suitable spatially corresponding plurality of work access openings 102 for the plurality of securing devices 350 to cooperate with the locking element 140. The respective securing device 350 has a conical tip 354 for insertion into the corresponding work access opening 102 so as to cooperate, for example, with an upper edge of the locking element 140 when the securing device is inserted into the work access openings and change a state of the locking element.

The annular support 356 and a core of the respective securing device 350 are produced from a plastic. The respective securing device 350 has an outer metal sleeve 361 so that it can be more heavily loaded mechanically, this outer metal sleeve 361 being secured against displacement relative to the core by a circumferential crimp 362 on a circumference of the securing device. The circumferential crimp 362 causes a frictional and positive engagement of the metal sleeve 361 with the core of the respective securing device 350.

Figure 4:
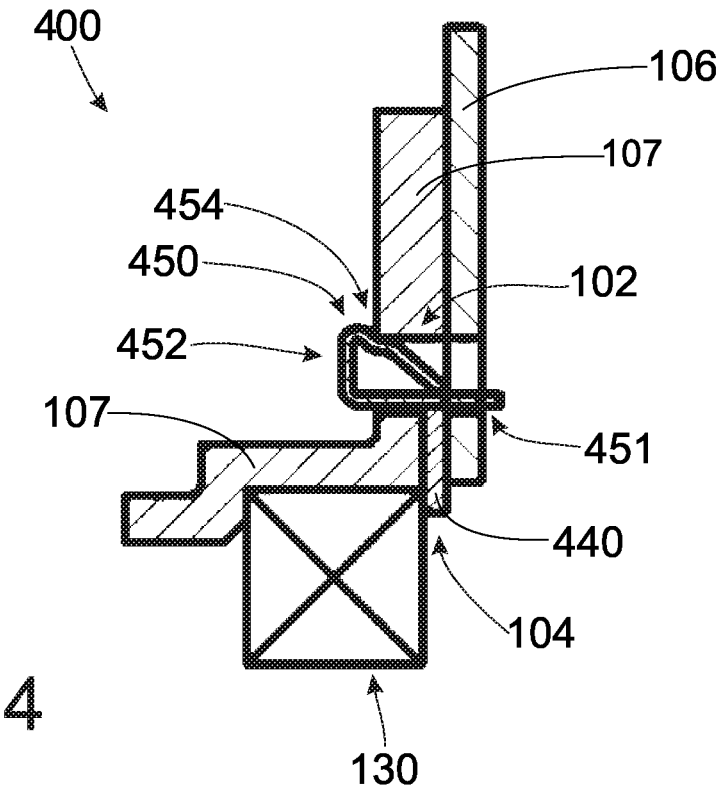
FIG. 4 a cross section of a bearing arrangement.

FIG. 4 shows bearing arrangement 400 with at last one securing device formed as a clamp from a shaped flat metal material with essentially three flat parts. The flat metal material is shaped in such a way that two of the parts substantially form a right angle relative to one another and the third part forms an angle relative to a middle part such that this clamp forms a wedge-shaped sliding surface. A crimp for fixing the clamp in a work access opening of the machine element is arranged inside of the wedge-shaped sliding surface.

FIGS. 5A to 5D show a bearing arrangement 500 with a locking element 540 and with a plurality of tongues 542 which are adjusted relative to a radial portion of the locking element 540. The radial portion of the locking element 540 is arranged in a groove 104 constructed in the manner described above. The machine element 105 has a suitable spatially corresponding plurality of work access openings 102. Each of the tongues 542 extends through a corresponding work access opening 102 and beyond to an outer side of the machine element 105 in the mounting state of the bearing arrangement 500. The securing device is configured as a closed ring 550 with a trapezoidal cross section, and the ring 550 is configured in such a way and cooperates with an end region of the respective tongue 542 in such a way that the securing state of the locking element 540 is secured.

Figure 5A:
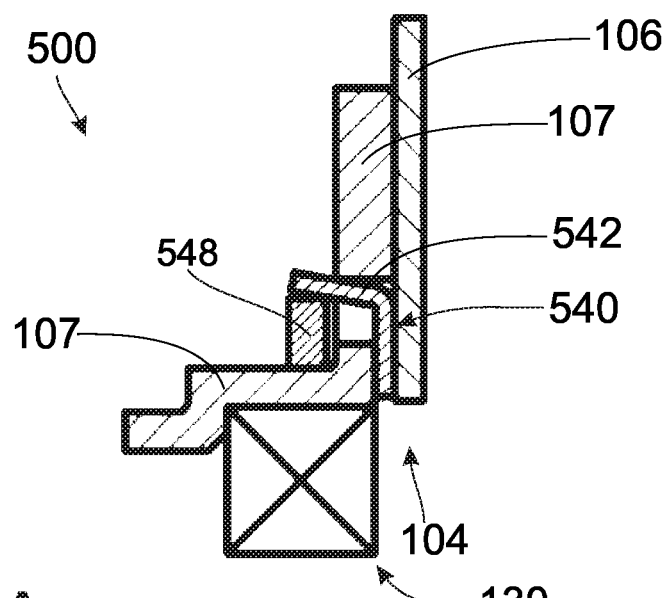
FIG. 5A a cross section of a bearing arrangement.
Figure 5B:
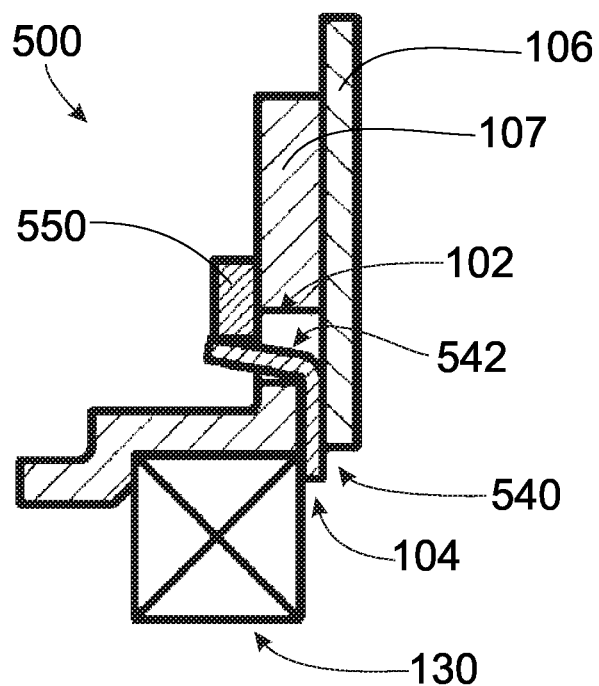
FIG. 5B a cross section of the bearing arrangement from FIG. 5A.
Figure 5C:
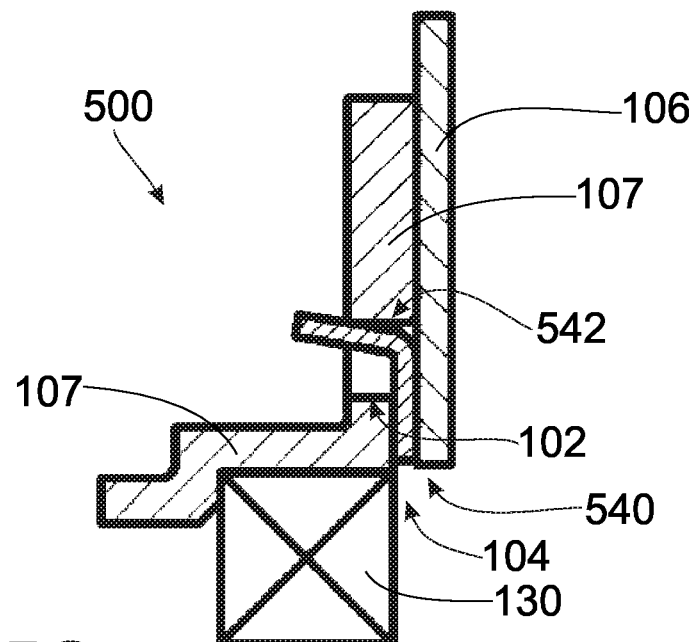
FIG. 5C a cross section of a bearing arrangement.
Figure 5D:
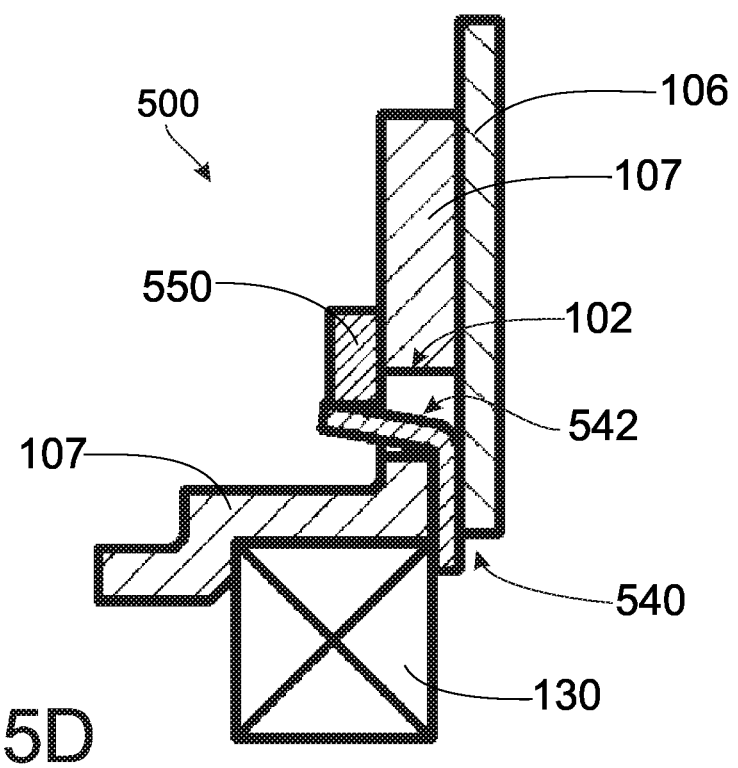
FIG. 5D a cross section of the bearing arrangement from FIG. 5C.
Figure 6A:
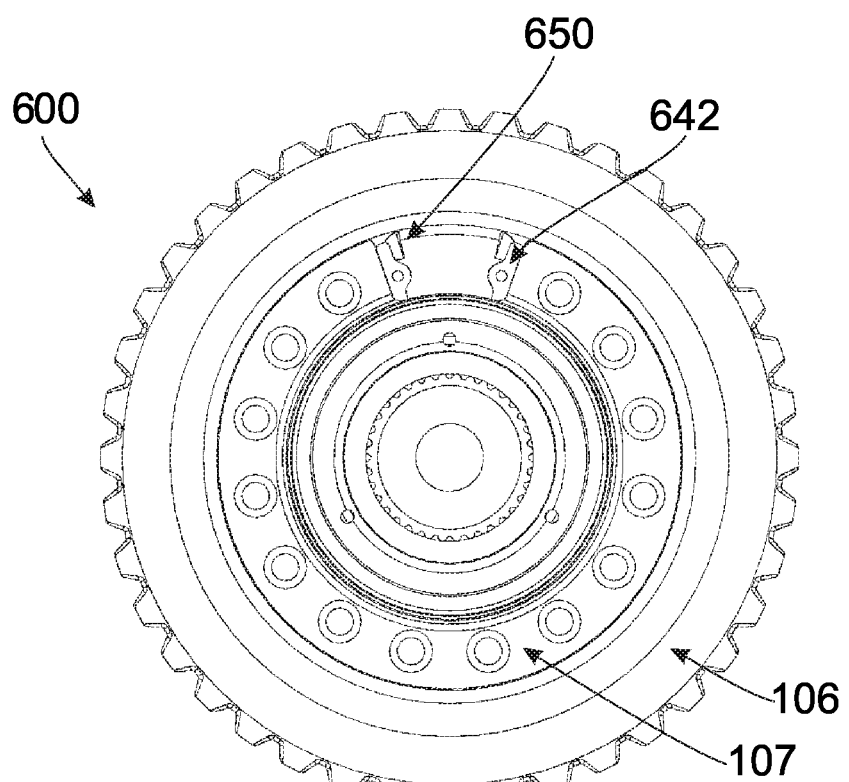
FIG. 6A a bearing arrangement.
Figure 6B:
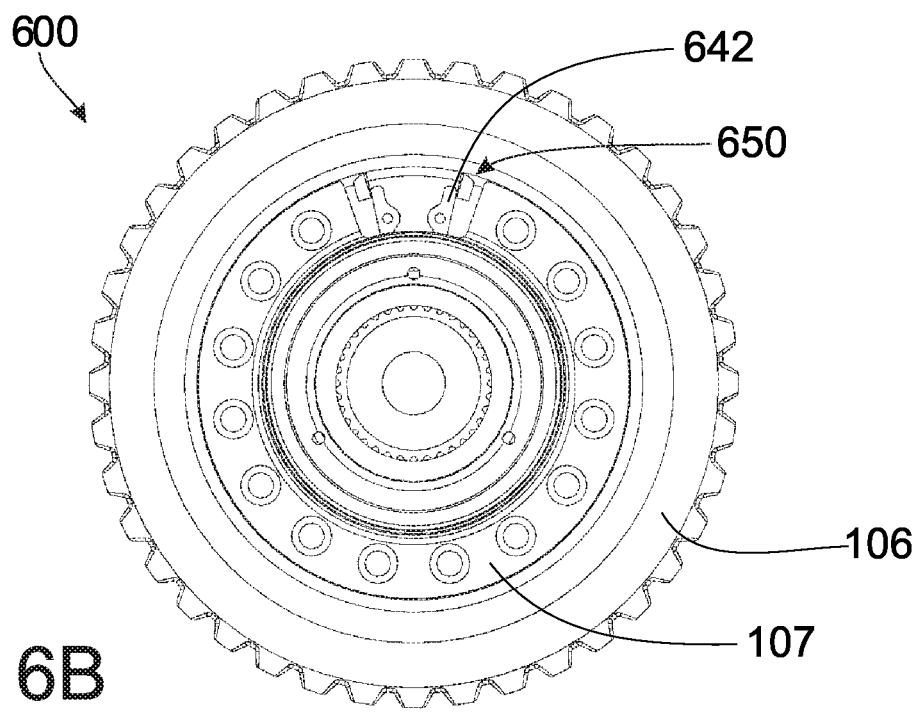
FIG. 6B a bearing arrangement from FIG. 6A.
Figure 6C:
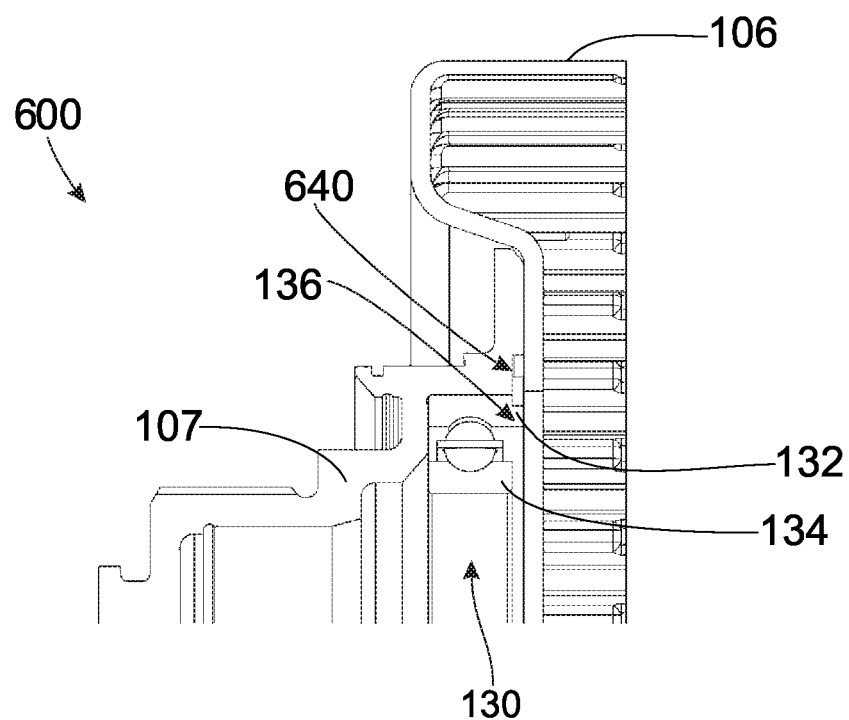
FIG. 6C a cross section through the bearing arrangement from FIG. 6A.
Figure 6D:
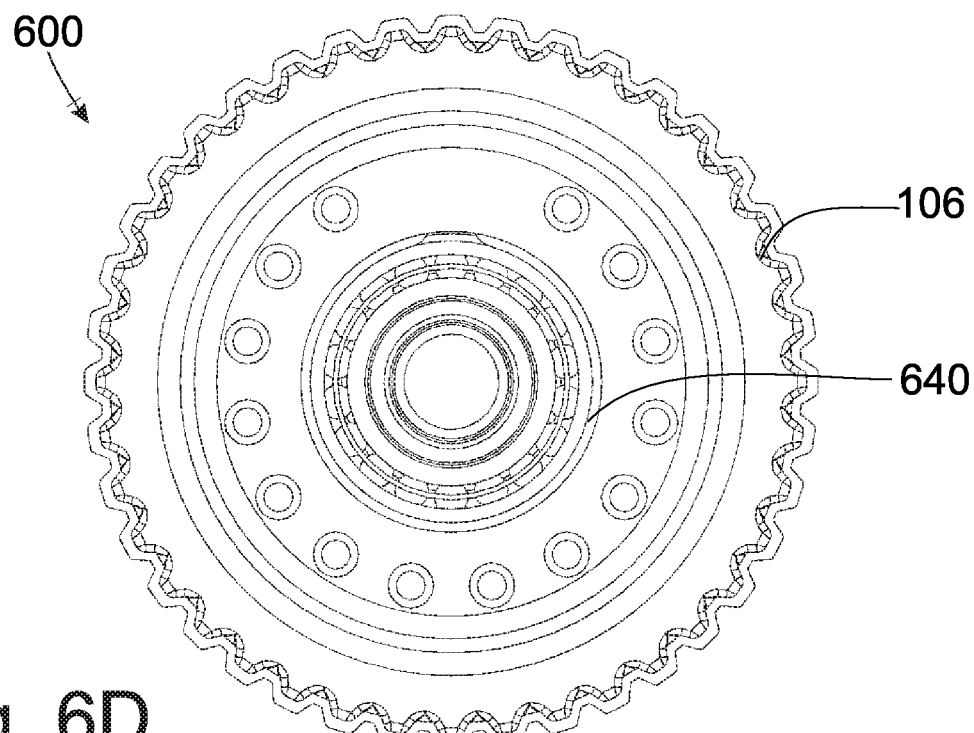
FIG. 6D a bearing arrangement from FIG. 6a viewed from the bearing.
Figure 6E:
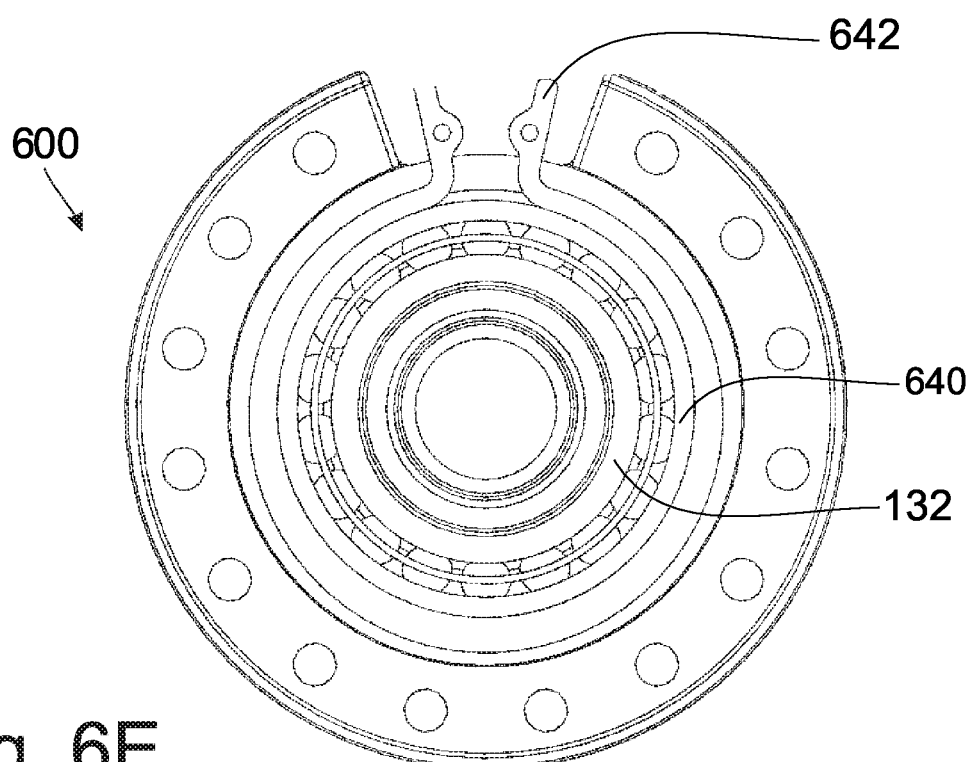
FIG. 6E a bearing arrangement from FIG. 6a viewed from the bearing without plate carrier.
Figure 6F:
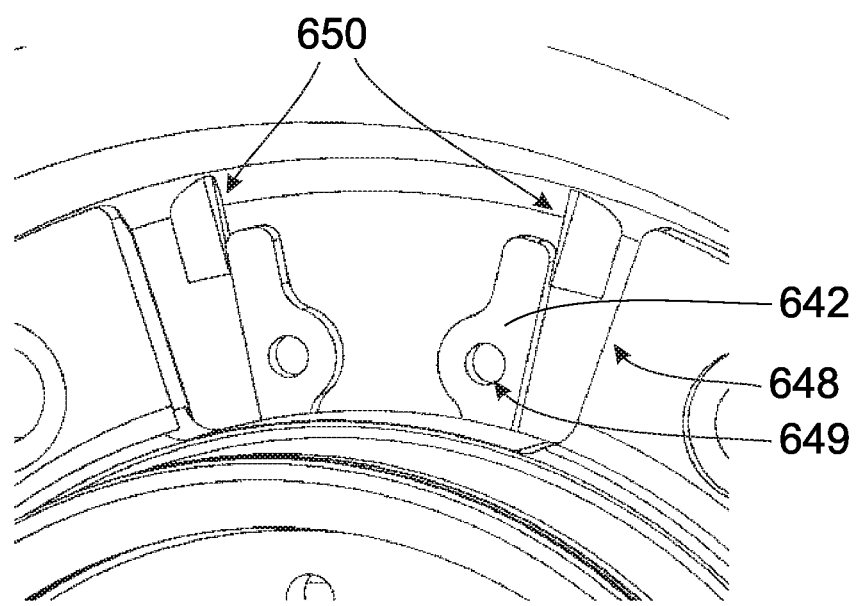
FIG. 6F a detail view of the bearing arrangement from FIG. 6B.

FIG. 5A shows that in the case of a locking element 540 which has an elastic relaxed state and which is connected to a small inner diameter, i.e., that the locking element 540 is in the securing state without being acted upon by external force, the mounting position of the locking element 540 can be fixed by a second ring that cooperates with the adjusted tongue 542 by positive engagement 540 such that the locking element 540 is prevented from transitioning into the securing state. FIGS. 5B and 5D show that the securing device in the form of the ring 550 secures in the securing state of the locking element 540 in case of an outwardly preloaded locking element 540 as well as in the case of an inwardly preloaded locking element 540. For a locking element 540 which is outwardly preloaded as in FIG. 5C, the mounting state of the locking element 540 need not be secured by an additional second ring because the locking element 540 occupies an inner diameter which is as large as possible owing to the preloading and accordingly releases the outer bearing race 132 of the bearing 130.

FIGS. 6A to 6F show a bearing arrangement 600 in which the locking element 640 is constructed as an open, elastic ring which has a locking leg 642 at each open end. The machine element 105 has two securing devices in the form of securing stops 650 that cooperate with the two locking legs 642 in such a way that the locking element 640 is in the mounting state or the securing state depending on a position of the two locking legs 642 relative to the securing stops 650.

The locking legs 642 of the locking element 640 are configured with an eye 649 to receive a tool in order to adjust the position of the locking legs 642 relative to the securing stops 650 for the mounting state or the securing state.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A bearing arrangement for a machine element, comprising:
    a bearing which has an outer bearing race;
    an annular locking element configured to secure the outer bearing race;
    a machine element which has a cylindrical cutout configured to receive and radially secure the outer bearing race;
    a circumferentially constructed groove which adjoins a first axial side of the cylindrical cutout and extends radially outward to receive the locking element at the first axial side of the groove;
    the locking element having an inner diameter which is larger in a mounting state than in a securing state, wherein the locking element is guided at least partially in the groove to secure the outer bearing race at the first axial side in the securing state; and
    at least one securing device configured to cooperate with the locking element to secure a changed state of the locking element,
    wherein the at least one securing device is configured to secure a state of the locking element proceeding from an outer side of the machine element opposite the first axial side of the cylindrical cutout.

2. The bearing arrangement according to claim 1, wherein the locking element is an open, elastic ring and has tongues which are directed radially inward to secure the outer bearing race at the first axial side of the cylindrical cutout with a radially inner end region of the tongues.

3. The bearing arrangement according to claim 1, wherein the at least one securing device is movably arranged in a work access opening of the machine element such that the at least one securing device through displacement in the work access opening cooperates with the locking element by a wedging effect such that the state of the locking element is changed and secured.

4. The bearing arrangement according to claim 3, wherein the at least one securing device is a threaded pin with the conical tip; the threaded pin has a mechanism on a side opposite the a for engagement of a tool; and the work access opening has a thread corresponding to the threaded pin to cooperate with the locking element and change and secure the state of the locking element during an insertion of the threaded pin into the work access opening.

5. The bearing arrangement according to claim 3, which has a plurality of securing devices arranged on an annular support, and the machine element has a suitable spatially corresponding plurality of work access openings, wherein the respective securing device has a conical tip for inserting into a corresponding work access opening in order to cooperate with the locking element during an insertion of the securing device into the work access opening and to change and secure the state of the locking element.

6. The bearing arrangement according to claim 5, wherein the annular support and a core of a respective securing device are produced from plastic and the respective securing device has an outer metal sleeve secured against displacement relative to the core by a crimp extending around a circumference of the securing device.

7. The bearing arrangement according to claim 3, wherein the at least one securing device is formed as a clamp from a shaped flat metal material with three flat parts and a wedge-shaped sliding surface and a crimp in the wedge-shaped sliding surface for fixing the clamp in a work access opening of the machine element.

8. The bearing arrangement according to claim 3, which has a plurality of securing devices arranged on an annular support, and the machine element has a suitable spatially corresponding plurality of work access openings, wherein the respective securing device has a wedge-shaped sliding surface for inserting into a corresponding work access opening so as to cooperate with the locking element and to change and secure the state of the locking element during an insertion of the securing device into the work access openings.

9. The bearing arrangement according to claim 8, wherein a respective securing device has a radially inwardly open groove in which the locking element can engage in a securing position in order to fix the securing device in the securing position of the locking element.

10. The bearing arrangement according to claim 3, wherein the locking element has a plurality of tongues which are adjusted relative to a radial portion of the locking element, wherein the radial portion of the locking element is arranged in the groove, and the machine element has a suitable spatially corresponding plurality of work access openings, wherein each tongue extends through a corresponding work access opening and beyond to the outer side of the machine element in the mounting state of the bearing arrangement; and the at least one securing device is configured as a closed ring with a trapezoidal cross section, wherein the closed ring is configured in such a way and cooperates with an end region of the respective tongue in such a way that the securing state of the locking element is secured.

11. The bearing arrangement according to claim 1, which has a plurality of securing devices and an annular support for the plurality of securing devices, wherein the plurality of securing devices are uniformly distributed on a circumference of the annular support.

12. The bearing arrangement according to claim 1, wherein the locking element is an open, elastic ring and has a locking leg at each open end; and the machine element has two securing stops which cooperate with the locking leg such that the locking element has the mounting state or the securing state depending on a position of the locking leg relative to the securing stops.

13. The bearing arrangement according to claim 12, wherein the locking leg receives a tool to adjust a position of the locking leg relative to the securing stops for the mounting state or the securing state.

14. The bearing arrangement according to claim 1, wherein the bearing arrangement mounts an input shaft on an output hub.

* * * * *